(12) United States Patent
Suzuki

(10) Patent No.: US 12,264,269 B2
(45) Date of Patent: Apr. 1, 2025

(54) CURABLE COMPOSITION, BONDED STRUCTURE, AND SEALING STRUCTURE

(71) Applicant: DENSO CORPORATION, Kariya (JP)

(72) Inventor: Katsuhiko Suzuki, Kariya (JP)

(73) Assignee: DENSO CORPORATION, Kariya (JP)

( * ) Notice: Subject to any disclaimer, the term of this patent is extended or adjusted under 35 U.S.C. 154(b) by 564 days.

(21) Appl. No.: 16/944,195

(22) Filed: Jul. 31, 2020

(65) Prior Publication Data

US 2021/0032518 A1 Feb. 4, 2021

(30) Foreign Application Priority Data

Jul. 31, 2019 (JP) .................. 2019-141351

(51) Int. Cl.
| | | |
|---|---|---|
| C09J 183/04 | (2006.01) | |
| C08K 9/10 | (2006.01) | |
| C09J 11/08 | (2006.01) | |

(52) U.S. Cl.
CPC ............ *C09J 183/04* (2013.01); *C09J 11/08* (2013.01); *C08K 9/10* (2013.01)

(58) Field of Classification Search
CPC ..... C08K 9/10; C09J 7/38; C09J 7/381; C09J 7/383; C09J 7/385; C09J 7/387
See application file for complete search history.

(56) References Cited

U.S. PATENT DOCUMENTS

| | | | | |
|---|---|---|---|---|
| 4,293,677 A | * | 10/1981 | Imai ................. | C08L 83/04 528/901 |
| 4,867,817 A | * | 9/1989 | Kneafsey ............ | B01J 19/10 156/73.6 |
| 4,940,852 A | * | 7/1990 | Chernack ............. | C08G 59/188 528/146 |
| 2006/0073334 A1 | * | 4/2006 | Schwantes ............ | C08J 3/24 428/402.2 |
| 2011/0086973 A1 | | 4/2011 | Kobayashi et al. | |
| 2017/0073518 A1 | | 3/2017 | Morita et al. | |
| 2019/0359874 A1 | | 11/2019 | Kitazawa | |

FOREIGN PATENT DOCUMENTS

| | | | | |
|---|---|---|---|---|
| CN | 107849353 A | | 3/2018 | |
| GB | 2133374 B | * | 4/1987 | ............ B01J 13/18 |
| JP | 2008-007585 A | | 1/2008 | |
| JP | 2012-052051 A | | 3/2012 | |
| JP | 2018-131510 A | | 8/2018 | |
| WO | WO-2009/150727 A1 | | 12/2009 | |

OTHER PUBLICATIONS

Ardebili, Haleh & Pecht, Michael. (2018). Encapsulation Technologies for Electronic Applications, 2nd Edition, p. 88 (Year: 2018).*
"Adhesive Application Technical Manual" compiled by Li Zidong, Shanghai Science and Technology Literature Publishing House, pp. 159-160, published Jul. 31, 1994.

* cited by examiner

*Primary Examiner* — Kregg T Brooks
*Assistant Examiner* — David R. Foss
(74) *Attorney, Agent, or Firm* — Harness, Dickey & Pierce, P.L.C.

(57) ABSTRACT

A curable composition is provided which includes a liquid first agent and microcapsules dispersed in the first agent. Each of the microcapsules includes a coating film and a second liquid agent encapsulated inside the coating film. A strength of each of the microcapsules is 15 N or less. The curable composition is configured to be cured by contact between the first agent and the second agent.

18 Claims, 2 Drawing Sheets

CURABLE COMPOSITION, BONDED STRUCTURE, AND SEALING STRUCTURE

CROSS-REFERENCE TO RELATED APPLICATION

This application is based on and claims the benefit of priority from earlier Japanese Patent Application No. 2019-141351 filed Jul. 31, 2019, the description of which is incorporated herein by reference.

BACKGROUND

Technical Field

The present disclosure relates to a curable composition, a bonded structure, and a sealing structure.

Related Art

Curable compositions are used for various purposes such as adhesives for bonding components of an electronic device together, and casting materials covering electronic components arranged in cases of electronic devices. As this type of curable composition, a so-called one-pack curable type curable composition is known in which all components are previously mixed.

SUMMARY

As an aspect of the present disclosure, a curable composition is provided which includes: a liquid first agent; and microcapsules dispersed in the first agent. Each of the microcapsules includes a coating film and a second liquid agent encapsulated inside the coating film. A strength of each of the microcapsules is 15 N or less. The curable composition is configured to be cured by contact between the first agent and the second agent.

BRIEF DESCRIPTION OF THE DRAWINGS

In the accompanying drawings.

DETAILED DESCRIPTION OF THE PREFERRED EMBODIMENTS

Curable compositions are used for various purposes such as adhesives for bonding components of an electronic device together, and casting materials covering electronic components arranged in cases of electronic devices. As this type of curable composition, a so-called one-pack curable type curable composition is known in which all components are previously mixed.

Recently, in order to shorten the time required for manufacturing electronic devices or the like to enhance the productivity, it is desired to shorten curing time of a curable composition. However, if curing time of a one-pack curable type curable composition, that is, required time from application or casting of the curable composition to the completion of a curing reaction is shortened, stability of preservation of the curable composition may be decreased, whereby the curable composition may be easily cured during storage. Hence, from the view point of preventing the stability of preservation from decreasing, the one-pack curable type curable composition has a limitation in shortening the curing time.

In a field of thread locking agents, a technique has been proposed which is for encapsulating a curing agent and the like of a one-pack curable type curable composition inside a coating film to shorten curing time while the stability of preservation is ensured. For example, JP-A-2012-52051 discloses a curable composition for epoxy resin including (a) a microcapsule type curing agent containing a core and a shell that covers the core, and (b) epoxy resin.

However, the curable composition for epoxy resin in JP-A-2012-52051 requires that a relatively strong external force, for example, an axial force applied when a screw is tightened, is applied to release the core, which is an inclusion, from the microcapsule type curing agent. Hence, when the curable composition for epoxy resin in JP-A-2012-52051 is used for assembling an electronic device or the like, it is required to apply a strong external force to the curable composition to release the core from the microcapsule type curing agent, which may decrease workability.

The present disclosure has been made in light of the problem set forth above and has as its object to provide a curable composition having good workability of assembly, and a bonded structure and a sealing structure using the curable composition.

First Embodiment

Figure 1:
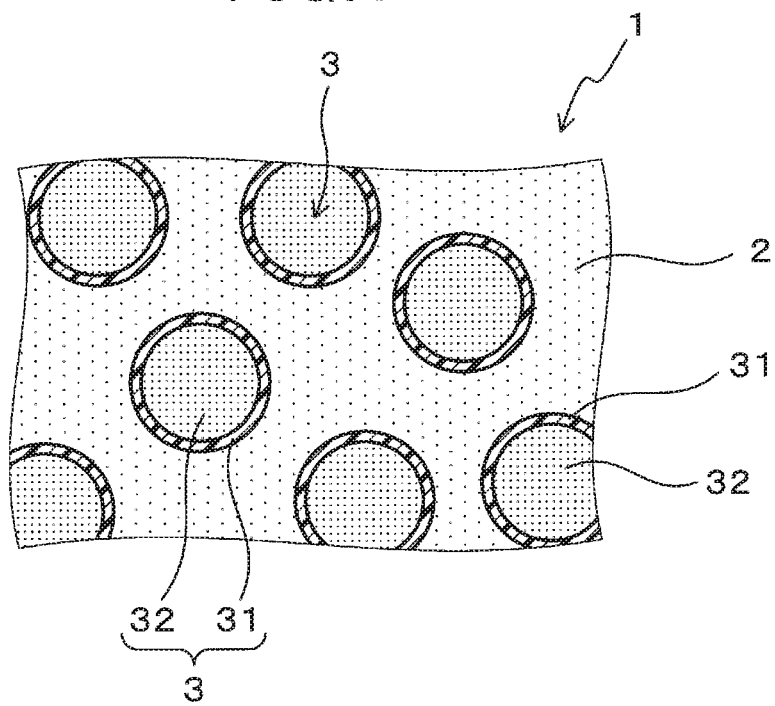
FIG. 1 is an explanatory drawing schematically illustrating a curable composition according to a first embodiment.

An embodiment of a curable composition will be described with reference to FIG. 1. As shown in FIG. 1, a curable composition 1 includes a first liquid agent 2, and microcapsules 3 dispersed in the first agent 2. The microcapsule 3 includes a coating film 31 and a second liquid agent 32 encapsulated inside the coating film 31. The strength of the microcapsule 3 is 15 N or less. The curable composition 1 is constituted so as to be cured by the contact between the first agent 2 and the second agents 32.

Setting the strength of the microcapsule 3 in the curable composition 1 to 15 N or less can easily release the second agent 32 from the microcapsule 3 in a process for bonding adherends together, a process for discharging the curable composition 1 from a nozzle of, for example, a coater or the like. Hence, a curing reaction can proceed to cure the curable composition 1.

In the curable composition 1, microcapsules 3 having a strength more than 15 N may be included if the advantageous effect described above is not lost. From the view point of more reliably providing the advantageous effect of easily release the second agent 32 from the microcapsule 3, the maximum value of the strength of the microcapsule 3 included in the curable composition 1 is preferably 15 N or less. That is, it is preferable that microcapsules 3 having a strength more than 15N are not included in the curable composition 1.

A strength of the microcapsule 3 included in the curable composition 1 can be measured by the following method. First, the microcapsule 3 in which the second agent 32 is encapsulated is extracted from the first agent 2 of the curable composition 1. More specifically, the microcapsule 3 may be taken by using tweezers or the like while the curable composition 1 is observed under a microscope. Next, the microcapsule 3 is compressed by using a texture analyzer or the like. The maximum load on a load displacement curve obtained by the compression test, that is, a curve drawn in a state where the horizontal axis indicates displacement of a probe and the vertical axis indicates a load applied to the probe is defined as a strength of the microcapsule 3.

An average diameter of the microcapsules 3 is preferably 0.1 mm or more and 1.0 mm or less. In this case, external force can be more reliably applied to the microcapsules 3 in a process for bonding adherends together, a process for discharging the curable composition from a nozzle of, for example, a coater or the like. As a result, the second agents 32 can be more easily released from the microcapsules 3.

An average diameter of the microcapsules 3 can be calculated by the following method. That is, the curable composition 1 is observed by using a microscope to measure diameters of the microcapsules 3 present in the visual field. Then, an arithmetic average of the obtained diameters of the microcapsules 3 is defined as an average diameter of the microcapsules 3. The number of the microcapsules 3 whose diameter is to be measured is not limited. However, as the number of the microcapsules 3 increases, a more exact average diameter can be obtained. From such a viewpoint, it is preferable to measure diameters of 20 or more microcapsules 3 and define an arithmetic average thereof as an average diameter of the microcapsules 3.

The number of microcapsules 3 included in the curable composition 1 can be appropriately set according to composition of the first agent 2 and the second agents 32. For example, the number of microcapsules 3 may be 50 mass % or less of the mass of the whole curable composition 1, that is, the total mass of the first agent 2 and the microcapsules 3. In this case, the mixing ratio between the first agent 2 and the second agents 32 can be more easily adjusted to an appropriate range.

In addition, the number of microcapsules 3 is preferably 5 mass % or more and 50 mass % or less of the mass of the whole curable composition 1, and is more preferably 10 mass % or more and 30 mass % or less of the mass of the whole curable composition 1. In this case, a deviation of the distribution of the second agents 32 can be further decreased to mix the first agent 2 and the second agents 32 further uniformly. As a result, variation in physical properties of cured products can be further decreased.

The microcapsule 3 includes the coating film 31 and the second agent 32 encapsulated inside the coating film 31. The coating film 31 may consist of a single layer. In this case, a process of manufacturing the microcapsules 3 can be simplified.

In addition, the coating film 31 may include two or more layers including a first layer contacting the second agent 32 and a second layer laminated on the first layer. In this case, materials forming respective layers may be the same or may be different from each other. The coating film 31 including such two or more layers can effectively prevent generation of defects such as a variation in thickness of the whole coating film 31 and pinholes. Hence, the second agent 32 can be further effectively prevented from being involuntarily released from the microcapsule 3, thereby further increasing stability of preservation of the curable composition 1.

The mass of the coating film 31 is preferably equal to or less than 30 mass % of the mass of the microcapsule 3. In this case, further increasing the ratio of the second agent 32 to the microcapsule 3 can more easily adjust the ratio between the first agent 2 and the second agents 32 to an appropriate range.

In addition, the mass of the coating film 31 is preferably 3 mass % or more and 30 mass % or less of the mass of the microcapsule 3, and is more preferably 7 mass % or more and 20 mass % or less of the mass of the microcapsule 3. In this case, occurrence of defects such as a variation in thickness of the whole coating film 31 and pinholes can be further effectively prevented. As a result, the second agent 32 can be further effectively prevented from being involuntarily released from the microcapsule 3, thereby further increasing stability of preservation of the curable composition 1.

The material of the coating film 31 is not specifically limited as long as the microcapsule 3 can be produced. The coating film 31 may be formed of one of or two or more of gelatin, acrylic resin, amide resin, and melamine resin.

The curable composition 1 is constituted so that the second agents 32 are released from the microcapsules 3 and contact the first agent 2, whereby a curing reaction can proceed. Components involved in the curing reaction are changed depending the type of a cured product. Hence, components included in the first agent 2 and components included in the second agent 32 may be appropriately selected depending on the type of a cured product.

For example, when the curable composition 1 is constituted so that two types of components such as a main agent and a curing agent or a main agent and a reaction initiator can form a cured product involved in the curing reaction, the main agent may be compounded with any one of the first agent 2 and the second agent 32, and the curing agent or the reaction initiator may be compounded with the other of the first agent 2 and the second agent 32.

As this type of cured product, acrylic resin can be exemplified.

When the curable composition 1 is constituted so that acrylic resin can be formed, (meth)acrylate monomer, (meth) acrylate oligomer, and the like can be used as the main agent. These compounds may be used singly, or two or more of these compounds may be used together.

In addition, as the reaction initiator, a compound having a hydrosilyl group, a compound having an acid anhydride group, a compound having a thiol group, a compound having an amide group, a compound having an amino group, a compound having an isocyanate group, a compound having an epoxy group, a compound having a carboxyl group, a compound having an imidazole group, a compound having a silanol group, a metal chelate compound, a carbodiimide, an aziridine, an alkoxysilanol, and the like can be used. These compounds may be used singly, or two or more of these compounds may be used together.

When the curable composition 1 is constituted so that three types of components such as a main agent, a curing agent, and a catalyst, or a main agent, a curing agent, and a curing accelerator can form a cured product involved in the curing reaction, two or more types of components of the three components may be compounded with any one of the first agent 2 and the second agent 32. That is, for example, the curable composition 1 may be constituted so that one or two types of components of the three components is included in the first agent 2, and components of the three components not included in the first agent 2 are included in the second agent 32. The curable composition 1 may be constituted so that two types of components of the three components are included in the first agent 2, and the second agent 32 includes the component not included in the first agent 2 and any one of the two types of components included in the first agent 2.

As this type of cured product, urethane resin, epoxy resin, and silicone resin can be exemplified.

When the curable composition 1 is constituted so that urethane resin can be formed, a polyol and the like can be used as the main agent. These compounds may be used singly, or two or more of these compounds may be used together. In addition, as the curing agent, a diisocyanate, a triisocyanate, a polyisocyanate, and the like can be used. These compounds may be used singly, or two or more of these compounds may be used together. In addition, as the catalyst, a metal chelate compound, a metal alkoxide, and the like can be used. These compounds may be used singly, or two or more of these compounds may be used together.

When the curable composition 1 is constituted so that epoxy resin can be formed, an epoxy monomer, an epoxy prepolymer, and the like can be used as the main agent. These compounds may be used singly, or two or more of these compounds may be used together. In addition, as the curing agent, an amine-based curing agent, an acid anhydride-based curing agent, a thiol-based curing agent, dicyandlamide, a polyamide-based curing agent, and the like can be used. These compounds may be used singly, or two or more of these compounds may be used together. In addition, as the curing accelerator, an imidazole-based curing accelerator and the like can be used. These compounds may be used singly, or two or more of these compounds may be used together.

When the curable composition 1 is constituted so that silicone resin can be formed, a vinyl group-containing organopolysiloxane and the like can be used as the main agent. These compounds may be used singly, or two or more of these compounds may be used together. In addition, as the curing agent, an organohydrogen polysiloxane, that is, an organopolysiloxane having a Si—H group and the like can be used. These compounds may be used singly, or two or more of these compounds may be used together. In addition, as the catalyst, a platinum catalyst and the like can be used. These compounds may be used singly, or two or more of these compounds may be used together.

Among the components described above, the main agent is preferably contained in the first agent 2, and the reaction initiator, the curing agent, the curing accelerator, and the catalyst are preferably contained in the second agent 32. Normally, the main agent is chemically stable compared with the curing agent and the like, and is unlikely to react to water, oxygen, and the like in the air. Hence, the main agent is compounded with the first agent 2 that is likely to contact the air, and components other than the main agent are compounded with the second agent 32, whereby stability of preservation of the curable composition 1 can be increased.

In addition, the curable composition may contain components not involved in the curing reaction such as a flame retardant, a flame retardant promoter, an antioxidant, a light stabilizer, a heat stabilizer, an antifoam agent, a leveling agent, a coloring agent, and a filling material. These components not involved in the curing reaction may be contained in the first agent or the second agent. The components not involved in the curing reaction may be contained in both of the first agent and the second agent.

In the curable composition 1, the viscosity of the second agent 32 is preferably 200 Pa·s or less and more preferably 10 Pa·s or less. In this case, the second agent 32 released from the microcapsule 3 is easily mixed with the first agent 2. As a result, variation in physical properties of a cured product can be decreased.

In the curable composition 1, the viscosity of the first agent 2 is preferably 1/10 times or more and 10 times or less the viscosity of the second agent 32. In this case, the second agent 32 released from the microcapsule 3 is easily mixed with the first agent 2. As a result, variation in physical properties of a cured product can be decreased. From a similar view point, the viscosity of the first agent 2 is preferably 1/3 times or more and 3 times or less the viscosity of the second agent 32 and is more preferably 0.5 times or more and 1.5 times or less the viscosity of the second agent 32. It is noted that the above viscosities of the first agent 2 and the second agent 32 are values at 23° C. In addition, the viscosities of the first agent 2 and the second agent 32 can be measured by using, for example, a B-type viscometer.

The second agent 32 of the curable composition 1 is encapsulated inside the coating film 31 of the microcapsule 3 as described above. In addition, the strength of the microcapsule 3 is within the specific range. Hence, in the curable composition 1, the second agent 32 can be easily released from the microcapsule 3 by external force generated during assembly of an electronic device such as pressing force applied when adherends are bonded together and shearing force generated when the curable composition is discharged from a nozzle of, for example, a coater. Hence, the curable composition 1 can improve workability of the assembly.

In addition, in the curable composition 1, the first agent 2 and the second agent 32 are separated by the coating film 31 until the second agent 32 is released. Hence, a curing reaction can be prevented from proceeding. Then, the second agent 32 is released from the microcapsule 3, whereby the first agent 2 and the second agent 32 contact each other for the first time, which can initiate the curing reaction. Thus, curing time of the curable composition 1 can be easily shortened while stability of preservation is ensured. Therefore, it can be anticipated that using the curable composition 1 improves the productivity of the assembly.

Second Embodiment

In the present embodiment, a bonded structure 4 produced using the curable composition 1 of the first embodiment will be described. Among the reference numerals used in the second embodiment and later, the same reference numerals as those used in the aforementioned embodiments indicate elements similar to those in the aforementioned embodiments unless otherwise specified.

Figure 2:
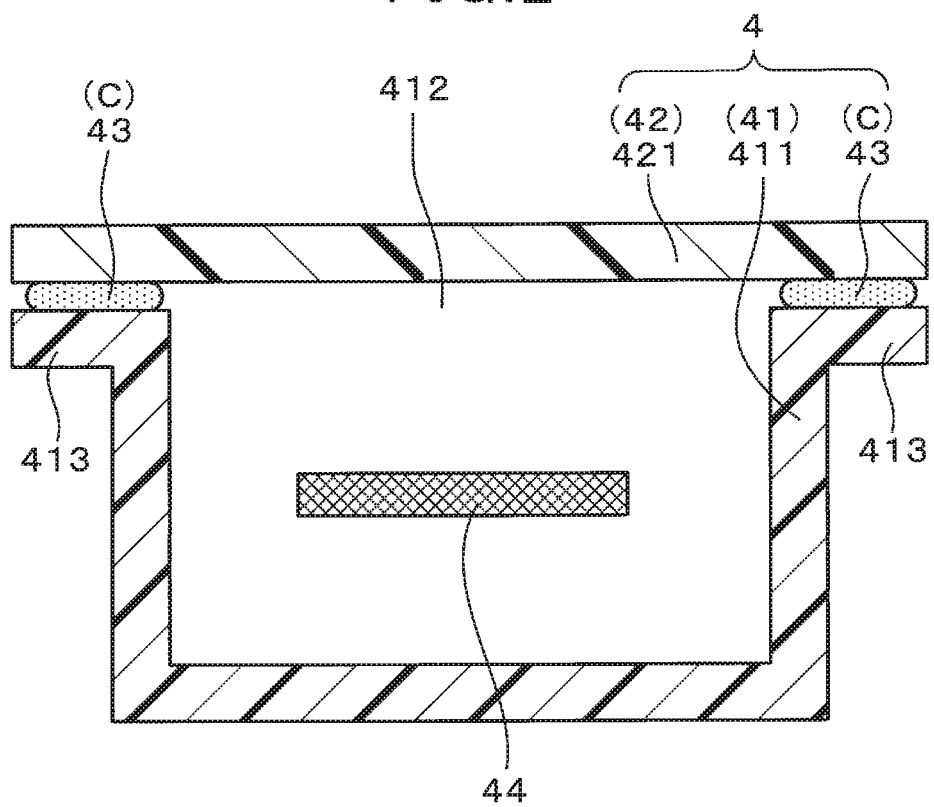
FIG. 2 is a cross-section view schematically illustrating a main part of a bonded structure according to a second embodiment.

The bonded structure 4 of the present embodiment includes, as shown in FIG. 2, a first adherend 41, a second adherend 42, and an adhesive 43 that intervenes between the first adherend 41 and the second adherend 42 and bonds the first adherend and the second adherend together. The adhesive 43 consists of a cured product C of the curable composition 1.

The first adherend 41 and the second adherend 42 of the bonded structure 4 are not specifically limited. For example, bonding an electronic component 44 serving as the first adherend 41 and a case serving as the second adherend 42 together via the adhesive 43 can constitute an electronic device serving as the bonded structure 4. As the electronic component 44, for example, a circuit board, a sensor element, a semiconductor device, and the like can be used.

The bonded structure 4 of the present embodiment includes, as shown in FIG. 2, a case body 411 serving as the first adherend 41 and a lid body 421 serving as the second adherend 42. The case body 411 has a bottomed box shape and includes a flange part 413 extending outward from a border of an opening 412. The lid body 421 is disposed so as to cover the flange part 413 and the opening 412 of the case. The adhesive 43 arranged along the whole circumference of the flange part 413 intervenes between the flange part 413 and the lid body 421. Disposing the electronic component 44 inside the bonded structure 4 having the above structure can constitute the electronic device.

The bonded structure 4 of the present embodiment can be produced, for example, as below. First, after the electronic component 44 is disposed in the case, the curable composition 1 is applied along the whole circumference of the flange part 413 by using a dispenser or the like.

In this case, the curable composition 1 may be applied so that the state where the second agent 32 is encapsulated inside the coating film 31 of the microcapsule 3 is maintained. The strength of the microcapsule 3 contained in the curable composition 1 is 15 N or less. Hence, when the lid body 421 is placed on the case body 411, the second agent 32 can be easily released from the microcapsule 3 by applying such a load that is obtained by pressing the lid body 421 against the case body 411 by hand. Hence, in this case, at the same time when the lid body 421 is placed on the case body 411, the first agent 2 and the second agents 32 can contact each other to initiate a curing reaction. Thereafter, treatment such as heating is provided as necessary to completely cure the curable composition 1, whereby the bonded structure 4 can be obtained.

Although not shown, shearing force may be applied to the microcapsules 3 in the curable composition 1 by increasing pressure of a nozzle when the curable composition 1 is applied or increasing discharge speed, to release the second agents 32 from the microcapsules 3. In this case, at the same time when the curable composition 1 is discharged, the first agent 2 and the second agents 32 can contact each other to initiate a curing reaction of the curable composition 1 on the flange part 413. Hence, placing the lid body 421 on the case body 411 after the curable composition 1 is applied and before the curing reaction is completed can obtain the bonded structure 4.

As described above, according to the present embodiment, workability of assembly of the bonded structure 4 can be improved.

Third Embodiment

Figure 3:
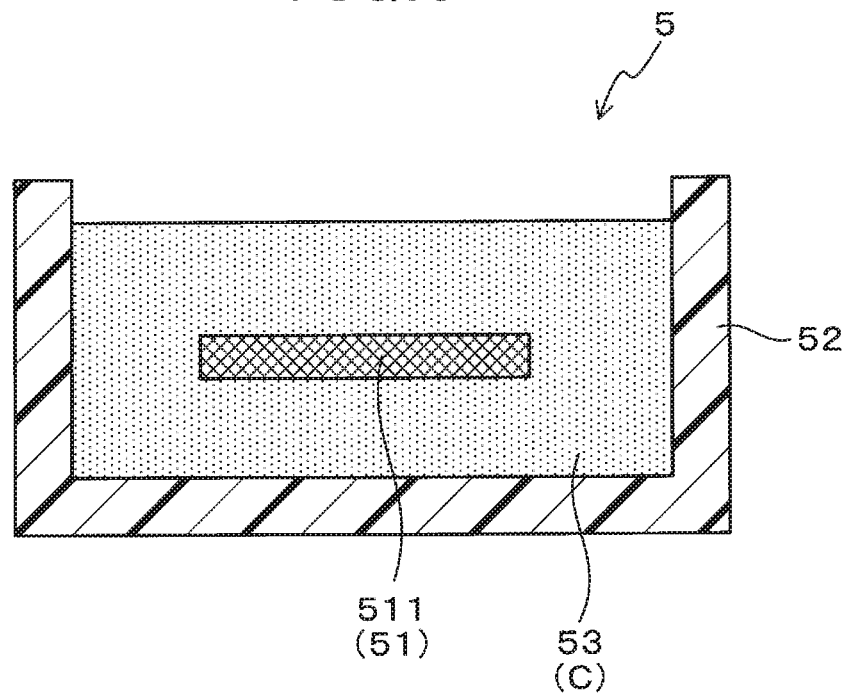
FIG. 3 is a cross-section view schematically illustrating a main part of a sealing structure according to a third embodiment.

In the present embodiment, a sealing structure 5 produced using the curable composition 1 of the first embodiment will be described. The sealing structure 5 of the present embodiment includes, as shown in FIG. 3, an object 51 to be sealed, a case 52 housing the object 51 to be sealed, and a casting material 53 with which the case 52 is filled. The casting material 53 consists of a cured product C of the curable composition 1.

The object 51 to be sealed of the sealing structure 5 is not specifically limited. For example, the object 51 to be sealed may be an electronic component such as a sensor and a circuit board. After such an electronic component is disposed in the case 52, the case 52 is filled with the casting material 53, whereby an electronic device can be constituted.

For example, the case 52 of the sealing structure 5 of the present embodiment has a bottomed box shape as shown in FIG. 3, and one surface of the case 52 is opened. An electronic component 511 serving as the object 51 to be sealed is housed in the case 52. The case 52 is filled with the casting material 53. The whole surfaces of the electronic component 511 are covered with the casting material 53. Although not shown, the electronic component 511 may project outward from the casting material 53 and have a wiring, a terminal, or the like for electrical connection with a peripheral device for the electronic device.

The sealing structure 5 of the present embodiment can be produced, for example, as below. First, after the electronic component 511 is housed in the case 52, the curable composition 1 is poured into the case 52. In this case, external force can be applied to the microcapsules 3 in the curable composition 1 by increasing pressure of a nozzle when the curable composition 1 is applied or increasing discharge speed, to release the second agents 32 from the microcapsules 3. Thereafter, after the whole surfaces of the electronic component 511 are covered with the curable composition 1, pouring the curable composition 1 is stopped. Then, treatment such as heating is provided as necessary to completely cure the curable composition 1, whereby the sealing structure 5 can be obtained.

Experimental Example

In the present example, curable compositions 1 having various constitutions were produced to evaluate adhesive properties. The constitutions of the curable compositions 1 (test agent T1 to test agent T5) produced in the present example will be described below.

Test Agent T1

Test agent T1 is the curable composition 1 constituted so as to form a silicone resin. The first agent 2 of the test agent T1 includes a vinyl group-containing organopolysiloxane serving as a main agent, a multifunctional organohydrogen polysiloxane serving as a curing agent, a silane coupling agent, and a filling material. The viscosity of the first agent 2 at 23° C. is 40 Pa·s.

In the first agent 2, the microcapsules 3 including the coating film 31 consisting of gelatin and the second agent 32 encapsulated inside the coating film 31 are dispersed. The diameter of the microcapsule 3 is in a range of 0.2 mm or more and 0.5 mm or less. The ratio of the content of the microcapsules 3 to the mass of the test agent T1, that is, the total mass of the first agent 2 and the microcapsules 3 is 10 mass %. The ratio of the mass of the coating film 31 to the mass of the microcapsule 3 is 8 mass %.

The second agent 32 includes a platinum catalyst and a vinyl group-containing organopolysiloxane serving as a main agent. The viscosity of the second agent 32 at 23° C. is 40 Pa·s.

Strengths of the microcapsules 3 extracted from the test agent T1 were measured by using a texture analyzer. An average value of the strengths of the microcapsules 3 was 0.35 N.

Test Agent T2

Test agent T2 is the curable composition 1 constituted so as to form a silicone resin. The first agent 2 and the second agent 32 of the test agent T2 are respectively the same as the first agent 2 and the second agent 32 of the test agent T1.

In the first agent 2, the microcapsules 3 including the coating film 31 consisting of gelatin and the second agent 32 encapsulated inside the coating film 31 are dispersed. The diameter of the microcapsule 3 is in a range of 0.2 mm or more and 0.5 mm or less. The ratio of the content of the microcapsules 3 to the mass of the test agent T2 is 10 mass %. The ratio of the mass of the coating film 31 to the mass of the microcapsule 3 is 13 mass %.

Strengths of the microcapsules 3 extracted from the test agent T2 were measured by using a texture analyzer. An average value of the strengths of the microcapsules 3 was 0.51 N.

Test Agent T3

Test agent T3 is the curable composition 1 constituted so as to form a silicone resin. The first agent 2 and the second agent 32 of the test agent T3 are respectively the same as the first agent 2 and the second agent 32 of the test agent T1.

In the first agent 2, the microcapsules 3 including the coating film 31 and the second agent 32 encapsulated inside the coating film 31 are dispersed. The diameter of the microcapsule 3 is in a range of 0.2 mm or more and 0.5 mm or less. The ratio of the content of the microcapsules 3 to the mass of the test agent T3 is 10 mass %.

The coating film 31 of the microcapsule 3 of the test agent T3 has a first layer consisting of gelatin and contacting the second agent 32 and a second layer consisting of acrylic resin and laminated on the first layer. The ratio of the mass of the coating film 31 to the mass of the microcapsule 3 is 15 mass %. The mass ratio between gelatin and acrylic resin of the coating film 31 is gelatin: acrylic resin=2:1.

Strengths of the microcapsules 3 extracted from the test agent T3 were measured by using a texture analyzer. An average value of the strengths of the microcapsules 3 was 0.93 N.

Test Agent T4

Test agent T4 is the curable composition 1 constituted so as to form a silicone resin. The first agent 2 of the test agent T4 includes a vinyl group-containing organopolysiloxane serving as a main agent, a multifunctional organohydrogen polysiloxane serving as a curing agent, a silane coupling agent, and a filling material. The viscosity of the first agent 2 at 23° C. is 1 Pa·s.

In the first agent 2, the microcapsules 3 including the coating film 31 consisting of acrylic resin and the second agent 32 encapsulated inside the coating film 31 are dispersed. The diameter of the microcapsule 3 is in a range of 0.2 mm or more and 0.5 mm or less. The ratio of the content of the microcapsules 3 to the mass of the test agent T4 is 10 mass %. The ratio of the mass of the coating film 31 to the mass of the microcapsule 3 is 30 mass %.

The second agent 32 includes a platinum catalyst and a vinyl group-containing organopolysiloxane serving as a main agent. The viscosity of the second agent 32 at 23° C. is 1 Pa·s.

Strengths of the microcapsules 3 extracted from the test agent T4 were measured by using a texture analyzer. An average value of the strengths of the microcapsules 3 was 10 N.

Test Agent T5

Test agent T5 is the curable composition 1 constituted so as to form a silicone resin. The first agent 2 of the test agent T5 includes a vinyl group-containing organopolysiloxane serving as a main agent, a multifunctional organohydrogen polysiloxane serving as a curing agent, a silane coupling agent, and a filling material. The viscosity of the first agent 2 at 23° C. is 200 Pa·s.

In the first agent 2, the microcapsules 3 including the coating film 31 consisting of melamine resin and the second agent 32 encapsulated inside the coating film 31 are dispersed. The diameter of the microcapsule 3 is 0.125 mm or less. The ratio of the content of the microcapsules 3 to the mass of the test agent T5 Is 10 mass %. The ratio of the mass of the coating film 31 to the mass of the microcapsule 3 is 70 mass %.

The second agent 32 includes a platinum catalyst and a vinyl group-containing organopolysiloxane serving as a main agent. The viscosity of the second agent 32 at 23° C. is 200 Pa·s.

A strength of the microcapsule 3 extracted from the test agent T5 was measured by using a texture analyzer. The strength of the microcapsule 3 was 100 N or more.

A tensile shear adhesive strength test was performed by using the test agents T1 to T5 described above according to the requirements of JIS K6850:1999. Specifically, first, as adherends, general-purpose steel plate cold commercials (i.e. SPCC) having a width of 25 mm and a length of 100 mm were prepared. The test agent was applied to an end in the longitudinal direction of one of the two adherends. Next, an end in the longitudinal direction of the other of the two adherends was superimposed on the test agent. The area of the superimposed portion had a width of 25 mm and a length of 10 mm.

Figure 4:
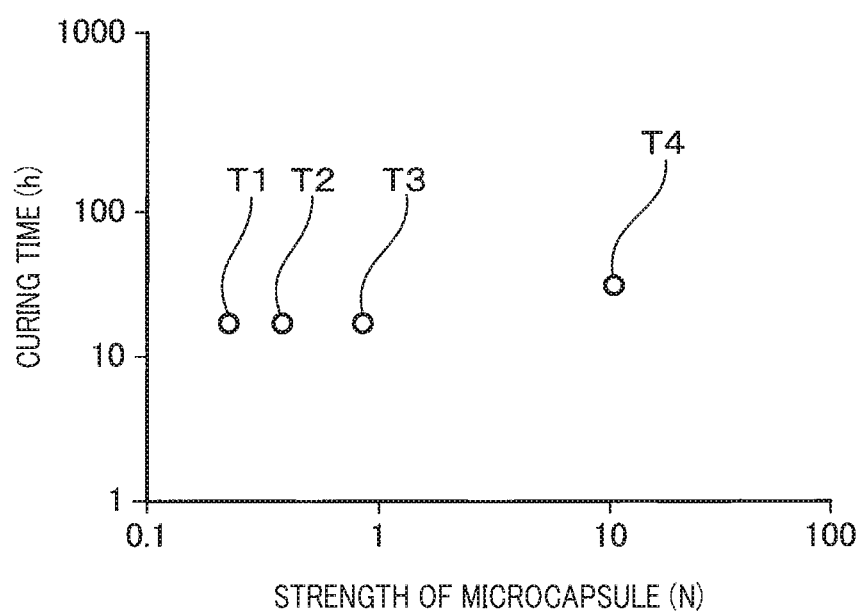
FIG. 4 is an explanatory drawing illustrating a result of an adhesion test according to an experimental example.

Thereafter, while the superimposed portion was pressed in the laminated direction, the adherends were left to stand under a room temperature environment for a day to produce a test piece. In this case, a load applied to the superimposed portion was 100 N. Then, from a time point when a load of 100 N had applied to the superimposed portion of the adherends, elapsed time had been measured until the adherends were bonded via the test agent. The result is shown in Table 1 and FIG. 4. In FIG. 4, the vertical axis indicates a common logarithm of elapsed time (time) until the adherends are bonded via the test agent, and the horizontal axis is a common logarithm of a strength of the microcapsule 3. Regarding the test agent T5, since the test agent was not cured when a day had passed, illustration is omitted from FIG. 4.

Regarding the test agents T1 to T4, after a day had passed from a time point when a load of 100 N had been applied to the superimposed portion, a tensile shear adhesive strength test was performed. Tensile shear adhesive strengths of the test agents T1 to T4 are shown in Table 1.

TABLE 1

|  | Strength of microcapsule (N) | Curing time (Time) | Shear adhesive strength (MPa) |
| --- | --- | --- | --- |
| Test agent T1 | 0.35 | 24 | 0.2 |
| Test agent T2 | 0.51 | 24 | 0.2 |
| Test agent T3 | 0.93 | 24 | 0.2 |
| Test agent T4 | 10 | 48 | 0.2 |
| Test agent T5 | >100 | — | — |

As shown in Table 1, since the strengths of the microcapsules 3 of the test agents T1 to T4 were within the specific range, the second agents 32 can be released from the microcapsules 3 by a load of about 100 N to bond the adherends together.

In contrast, since the strength of the microcapsule 3 of the test agent T5 was higher than the specific range, the second agents 32 cannot be released from the microcapsules 3 by a load of about 100 N.

As a result of the above, it can be understood that, in the curable composition 1 including the first agent 2 and the microcapsules 3 dispersed in the first agent 2, by setting the strength of the microcapsule 3, in which the second agent 32 is encapsulated, within the specific range, the curable composition 1 having good workability of assembly can be obtained.

The present disclosure is not limited to the above embodiments and can be applied to various embodiments within a range that does not deviate from the spirit of the present disclosure.

As an aspect of the present disclosure, a curable composition (1) is provided which includes: a liquid first agent (2);

and microcapsules (3) dispersed in the first agent. Each of the microcapsules includes a coating film (31) and a second liquid agent (32) encapsulated inside the coating film. A strength of each of the microcapsules is 15 N or less. The curable composition is configured to be cured by contact between the first agent and the second agent.

As another aspect of the present disclosure, a bonded structure (4) is provided which includes: a first adherend (41, 411); a second adherend (42, 421); and an adhesive (43) that intervenes between the first adherend and the second adherend and bonds the first adherend and the second adherend together. The adhesive includes a cured product (C) of the above curable composition.

As another aspect of the present disclosure, a sealing structure (5) is provided which includes: an object (51, 511) to be sealed; a case (52) that houses the object to be sealed; and a casting material (53) with which the case is filled. The casting material includes a cured product (C) of the above curable composition.

The second agent of the curable composition is encapsulated inside the coating film of the microcapsule. In addition, the strength of the microcapsule is within the specific range. Hence, in the curable composition, the second agent can be easily released from the microcapsule by an external force generated during assembly of the bonded structure or the sealing structure such as a pressing force applied when adherends are bonded together and shearing a force generated when the curable composition is discharged from a nozzle of, for example, a coater. Hence, the curable composition can improve workability of the assembly.

As described above, according to the above embodiments, a curable composition having good workability of assembly, and a bonded structure and a sealing structure using the curable composition can be provided.

What is claimed is:

1. A curable composition comprising:
   a liquid first agent; and
   microcapsules dispersed in the first agent, wherein
   each of the microcapsules includes a coating film and a liquid second agent encapsulated inside the coating film,
   a strength of each of the microcapsules is greater than or equal to 0.35 Newtons and less than or equal to 10 Newtons,
   an average diameter of the microcapsules is greater than or equal to 0.2 millimeters and less than or equal to 0.5 millimeters,
   the curable composition is configured to be cured by contact between the first agent and the second agent, and
   a mass of the coating film is equal to or greater than 7 mass % and equal to or less than 15 mass % of a mass of the microcapsule.

2. The curable composition according to claim 1, wherein the coating film includes a first layer contacting the second agent and a second layer laminated on the first layer.

3. A bonded structure comprising:
   a first adherend;
   a second adherend; and
   an adhesive that intervenes between the first adherend and the second adherend and bonds the first adherend and the second adherend together, wherein
   the adhesive includes a cured product of the curable composition according to claim 1.

4. A sealing structure comprising:
   an object to be sealed;
   a case that houses the object to be sealed; and
   a casting material with which the case is filled, wherein
   the casting material includes a cured product of the curable composition according to claim 1.

5. The curable composition according to claim 1, wherein a quantity of the microcapsules is equal to or greater than 5 mass % and equal to or less than 50 mass % of a total mass of the first agent and the microcapsules.

6. The curable composition according to claim 1, wherein a quantity of the microcapsules is equal to or greater than 10 mass % and equal to or less than 30 mass % of a total mass of the first agent and the microcapsules.

7. The curable composition according to claim 1, wherein a viscosity of the first agent is greater than or equal to 1 Pa·s and less than or equal to 40 Pa·s at a temperature of 23 degrees Celsius, and
   the viscosity of the second agent is greater than or equal to 1 Pa·s and less than or equal to 40 Pa·s at a temperature of 23 degrees Celsius.

8. The curable composition according to claim 1, wherein a strength of each of the microcapsules is greater than or equal to 0.35 Newtons and less than or equal to 0.93 Newtons.

9. The curable composition according to claim 1, wherein the coating film comprises gelatin and/or acrylic resin.

10. The curable composition according to claim 1, wherein the coating film comprises gelatin and optionally an acrylic resin.

11. The curable composition according to claim 1, wherein the curable composition is configured to be cured by contact between the first agent and the second agent to form an acrylic resin, and wherein the first agent comprises a main agent and the second agent comprises a curing agent or a reaction initiator.

12. The curable composition according to claim 1, wherein the curable composition is configured to be cured by contact between the first agent and the second agent to form a urethane resin, an epoxy resin, or a silicone resin, and wherein the first agent comprises a curing agent and a main agent and the second agent comprises a catalyst or a curing accelerator and optionally the main agent.

13. The curable composition according to claim 1, wherein the curable composition is configured to be cured by contact between the first agent and the second agent to form a silicone resin, wherein the first agent comprises a vinyl group-containing organopolysiloxane as a main agent and an organohydrogen polysiloxane as a curing agent, and wherein the second agent comprises a catalyst and optionally the main agent.

14. A curable composition comprising:
   a liquid first agent; and
   microcapsules dispersed in the first agent, wherein
   each of the microcapsules includes a coating film comprising gelatin and a liquid second agent encapsulated inside the coating film,
   a strength of each of the microcapsules is greater than or equal to 0.35 Newtons and less than or equal to 0.51 Newtons,
   an average diameter of the microcapsules is greater than or equal to 0.2 millimeters and less than or equal to 0.5 millimeters,
   the curable composition is configured to be cured by contact between the first agent and the second agent, and
   a mass of the coating film is equal to or greater than 7 mass % and equal to or less than 13 mass % of a mass of the microcapsule.

15. The curable composition according to claim 14, wherein
 a viscosity of the first agent is greater than or equal to 1 Pa·s and less than or equal to 40 Pa·s at a temperature of 23 degrees Celsius.

16. The curable composition according to claim 15, wherein the viscosity of the second agent is greater than or equal to 1 Pa·s and less than or equal to 40 Pa·s at a temperature of 23 degrees Celsius.

17. The curable composition according to claim 14, wherein
 a quantity of the microcapsules is equal to or greater than 5 mass % and equal to or less than 50 mass % of a total mass of the first agent and the microcapsules.

18. The curable composition according to claim 14, wherein
 a quantity of the microcapsules is equal to or greater than 10 mass % and equal to or less than 30 mass % of a total mass of the first agent and the microcapsules.

\* \* \* \* \*